(12) United States Patent
Yamaguchi

(10) Patent No.: US 11,159,030 B2
(45) Date of Patent: Oct. 26, 2021

(54) BATTERY PACK, SECONDARY BATTERY PROTECTING INTEGRATED CIRCUIT, BATTERY MONITORING MODULE, AND DATA READING METHOD

(71) Applicant: Takeshi Yamaguchi, Tokyo (JP)

(72) Inventor: Takeshi Yamaguchi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 218 days.

(21) Appl. No.: 15/911,308

(22) Filed: Mar. 5, 2018

(65) Prior Publication Data

US 2018/0287399 A1 Oct. 4, 2018

(30) Foreign Application Priority Data

Mar. 31, 2017 (JP) .............................. JP2017-070238

(51) Int. Cl.
*H02J 7/00* (2006.01)
*H01M 10/02* (2006.01)
(Continued)

(52) U.S. Cl.
CPC ........... *H02J 7/0021* (2013.01); *H01M 10/02* (2013.01); *H01M 10/425* (2013.01);
(Continued)

(58) Field of Classification Search
CPC ...... H02J 7/0021; H02J 7/0026; H02J 7/0029; H02J 7/00309; H02J 7/007192;
(Continued)

(56) References Cited

U.S. PATENT DOCUMENTS

2003/0108142 A1\* 6/2003 Hamaguchi .......... H03K 23/005
377/44
2006/0098366 A1\* 5/2006 Mashiko ............... H02J 7/0031
361/90

(Continued)

FOREIGN PATENT DOCUMENTS

JP 2005-018009 1/2005
JP 2007-273315 10/2007
(Continued)

OTHER PUBLICATIONS

Japanese Office Action for 2017-070238 dated Jun. 4, 2019.

*Primary Examiner* — Richard Isla
*Assistant Examiner* — Mohammed J Sharief
(74) *Attorney, Agent, or Firm* — IPUSA, PLLC

(57) ABSTRACT

A battery pack includes a secondary battery, a secondary battery protecting integrated circuit configured to protect the secondary battery, at least one sensor configured to output a fault signal indicating sensing of a fault in the battery pack or an electronic apparatus including the battery pack, a detecting circuit configured to output a fault detection signal indicating a detection of the fault signal, a delay circuit configured to output a pulse delaying from the fault detection signal, and a counter configured to count a number of generating the pulse, the counter having at least N bits (N is an integer greater than 1), wherein the counter stops an operation until a count of $2^{(N-1)}$.

13 Claims, 8 Drawing Sheets

(51) Int. Cl.
  *H01M 10/42* (2006.01)
  *H01M 10/48* (2006.01)
  *H01M 50/20* (2021.01)
  *H01M 50/209* (2021.01)
(52) U.S. Cl.
  CPC ......... *H01M 10/488* (2013.01); *H01M 50/20* (2021.01); *H01M 50/209* (2021.01); *H02J 7/0026* (2013.01)
(58) Field of Classification Search
  CPC .. H02J 7/0091; H02J 7/0031; H02J 2007/004; H02J 2007/0037; H01M 2/1016; H01M 10/02; H01M 10/48; Y02E 60/12
  USPC .................................................. 320/134, 136
  See application file for complete search history.

(56) References Cited

U.S. PATENT DOCUMENTS

| | | | | |
|---|---|---|---|---|
| 2007/0170893 A1* | 7/2007 | Kao | ..................... | G01R 31/367 320/132 |
| 2007/0229026 A1 | 10/2007 | Morioka et al. | | |
| 2008/0297116 A1* | 12/2008 | Odaohhara | ........... | H01M 10/48 320/137 |
| 2009/0121682 A1* | 5/2009 | Goto | ..................... | H02J 7/0029 320/134 |
| 2010/0259233 A1* | 10/2010 | Cheng | ................. | H02M 3/1588 323/265 |
| 2011/0019326 A1 | 1/2011 | Odaohhara | | |
| 2011/0059341 A1 | 3/2011 | Matsumoto et al. | | |
| 2011/0215765 A1* | 9/2011 | Shibata | ............... | H01M 10/425 320/134 |
| 2011/0273804 A1* | 11/2011 | Ikeuchi | ................. | H02J 7/0031 361/63 |
| 2016/0089092 A1* | 3/2016 | Sho | ..................... | A61B 6/4233 378/98 |
| 2018/0143256 A1 | 5/2018 | Horie et al. | | |

FOREIGN PATENT DOCUMENTS

| | | | | |
|---|---|---|---|---|
| JP | 2008-204878 | 9/2008 | | |
| JP | 2009-303364 | 12/2009 | | |
| JP | 2010-218704 | 9/2010 | | |
| JP | 2011-023317 | 2/2011 | | |
| JP | 2011-055647 | 3/2011 | | |
| JP | 2011-188606 | 9/2011 | | |
| WO | 2013/179345 | 12/2013 | | |
| WO | WO-2014026093 A1 * | 2/2014 | ......... | H01M 50/411 |
| WO | 2017/043248 | 3/2017 | | |

* cited by examiner

BATTERY PACK, SECONDARY BATTERY PROTECTING INTEGRATED CIRCUIT, BATTERY MONITORING MODULE, AND DATA READING METHOD

CROSS-REFERENCE TO RELATED APPLICATIONS

This patent application is based upon and claims the benefit of priority of Japanese Patent Application No. 2017-070238 filed on Mar. 31, 2017, the entire contents of which are incorporated herein by reference.

BACKGROUND OF THE INVENTION

1. Field of the Invention

The present invention relates to a battery pack, a secondary battery protecting integrated circuit, a battery monitoring module, and a data reading method.

2. Description of the Related Art

There is a technique of detecting that a case for accommodating a battery is disassembled by a user.

For example, there is a technique in which a disassembly detection signal is output from a disassembly detecting switch of detecting disassembly when a case accommodating a battery is disassembled and is caused to be stored in a memory (see, for example, Patent Document 1). Further, there is a technique in which a disassembly signal is caused to be stored in a nonvolatile memory upon sensing of an outside light by an optical sensor when a battery pack is disassembled (see, for example, Patent Document 2).

Patent Document 1: Japanese Unexamined Patent Application Publication No. 2007-273315

Patent Document 2: Japanese Unexamined Patent Application Publication No. 2010-218704

SUMMARY OF THE INVENTION

However, in the above techniques, because a history of the fault detection is caused to be stored in the nonvolatile memory, a circuit size is apt to increase.

Therefore, provided by this disclosure is a battery pack, a secondary battery protecting integrated circuit, and a battery monitoring module, which can restrict an increment of a circuit size for storing the history of the fault detection. Further, in this disclosure, there is provided a data reading method, by which the history of the fault detection can be easily read out.

A mode of this disclosure provides a battery pack including a secondary battery, a secondary battery protecting integrated circuit configured to protect the secondary battery, at least one sensor configured to output a fault signal indicating sensing of a fault in the battery pack or an electronic apparatus including the battery pack, a detecting circuit configured to output a fault detection signal indicating a detection of the fault signal, a delay circuit configured to output a pulse delaying from the fault detection signal, and a counter configured to count a number of generating the pulse, the counter having at least N bits (N is an integer greater than 1), wherein the counter stops an operation until a count of $2^{(N-1)}$.

Another mode of this disclosure provides a secondary battery protecting integrated circuit for protecting a secondary battery including a detecting circuit configured to detect a fault signal indicating sensing of a fault in the battery pack or an electronic apparatus including the battery pack and to output a fault detection signal indicating a detection of the fault signal, a delay circuit configured to output a pulse delaying from the fault detection signal, and a counter configured to count a number of generating the pulse, the counter having at least N bits (N is an integer greater than 1), wherein the counter stops an operation until a count of $2^{(N-1)}$.

Another mode of this disclosure provides a data reading method of reading a data from a secondary battery protecting integrated circuit of protecting a battery pack, the secondary battery protecting integrated circuit including an input terminal from which a fault signal indicating sensing of a fault in the battery pack or an electronic apparatus including the battery pack is input, a detecting circuit configured to output a fault detection signal indicating a detection of the fault signal, and a delay circuit configured to output a pulse delaying from the fault detection signal, and a counter configured to count a number of generating the pulse, the counter having at least N bits (N is an integer greater than 1), the data reading method including stopping an operation of the counter until a count of $2^{(N-1)}$, inputting a check pulse into the input terminal, and counting the check pulse until a carry is output from the counter.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF EMBODIMENTS

A description of embodiments of the present invention is given below with reference to figures.

Figure 1:
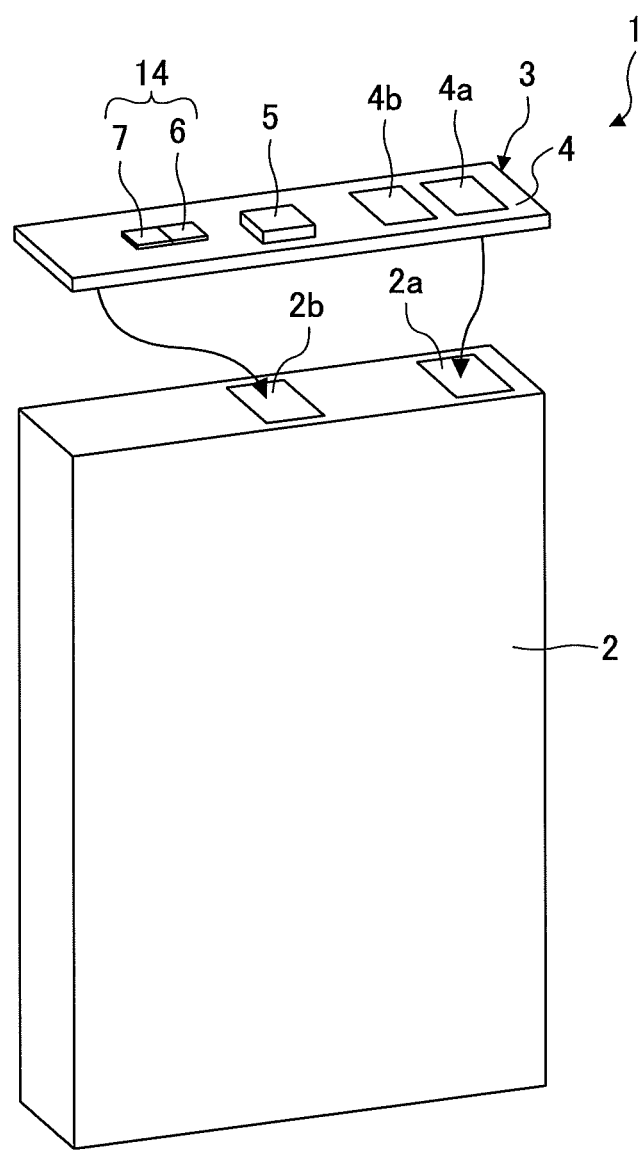
FIG. 1 illustrates an example of a structure of a battery pack.

FIG. 1 illustrates an example of a structure of a battery pack. The battery pack 1 is used as an electric power supply of a portable electronic apparatus. A specific example of the portable electronic apparatus, in which the battery pack 1 is installed, is a portable phone, a smartphone, and so on. The battery pack 1 includes a secondary battery 2 and a battery monitoring module 3. An appearance shape of the battery pack is not limited to that illustrated in FIG. 1.

The secondary battery 2 is an example of a secondary battery including a positive terminal 2a and a negative terminal 2b. An example of the secondary battery 2 is a lithium-ion battery or the like.

The battery monitoring module 3 monitors a state of the secondary battery 2. The battery monitoring module 3 includes a switch circuit 14, a protecting integrated circuit (IC) 5, and a board 4 on which the switch circuit 14 and the protecting IC 5 are mounted. The board 4 is, for example, a print wiring board.

On a back surface of the board 4, a positive side electrode part connected to a positive terminal 2a provided on a side surface of the secondary battery 2 and a negative side electrode part connected to a negative terminal 2b provided. Load connection terminals 4a and 4b, to which a portable electronic apparatus such as a portable phone, a charger for charging the secondary battery 2, or the like is connectable, are provided on one side (the right side in FIG. 1) of a principal face of the board 4.

The load connection terminal 4a is connected to the positive terminal 2a through wiring of the board 4, and the load connection terminal 4b is connected to the negative terminal 2b through the wiring of the board 4. A protecting IC 5 for protecting the secondary battery 2 is mounted on a center of the principal surface of the board 4.

The protecting IC 5 is an example of the secondary battery protecting integrated circuit for protecting the secondary battery 2 by controlling the switch circuit 14 connected to the secondary battery 2. The protecting IC 5 is a semiconductor chip of monitoring overcharge, over discharge, overcurrent, or the like of the secondary battery 2 and performing an operation of protecting the secondary battery 2. A switch circuit 14 including the switch parts 6 and 7 is provided on the other side (the right side in FIG. 1) of the principal face of the board 4.

Figure 2:
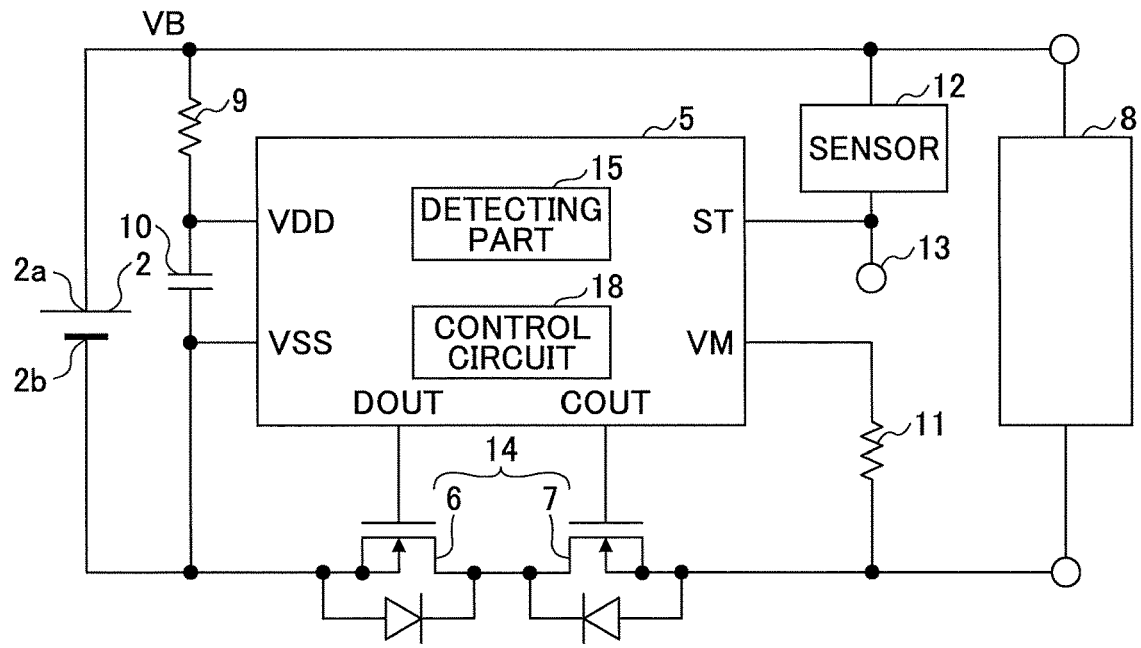
FIG. 2 illustrates an example of a circuit structure inside the battery pack.

FIG. 2 illustrates an example of a circuit structure inside the battery pack.

The protecting IC 5 includes an electric power supply terminal VDD, a ground terminal VSS, a discharge control terminal DOUT, a charge control terminal COUT, a current detection terminal VM, and a sensor input terminal ST. The electric power supply terminal VDD is connected to the positive terminal of the secondary battery 2 through a resistor element 9. A ground terminal VSS is connected to the negative terminal 2b of the secondary battery 2 (a reference ground potential) of the secondary battery 2. A capacitor 10 is connected in between the electric power supply terminal VDD and the ground terminal VSS.

The protecting IC 5 constantly protects the secondary battery 2. Therefore, the electric power supply voltage VB is constantly supplied to the protecting IC 5 in response to the battery voltage of the secondary battery 2.

One of connecting portions of the switch part 6 is connected to the negative terminal 2b of the secondary battery 22b. The other connecting portion of the switch part 6 is connected to one of connecting portions of the switch part 7.

The other connecting portion of the switch part 7 is connected to a current detection terminal VM through a resistor element 11. A load 8 (for example, a portable electronic apparatus such as a portable phone, a charger for charging the secondary battery 2, or the like) is connected in between the other connecting portion of the switch part 7 and the positive terminal 2a of the secondary battery 2.

A discharge control terminal DOUT is connected to a control terminal of the switch part 6. A charge control terminal COUT is connected to a control terminal of the switch part 7. The switch part 6 is turned on (conduction) or off (no conduction) based on a discharge control signal output from the discharge control terminal DOUT. The switch part 7 is turned on (conduction) or off (no conduction) based on a charge control signal output from the charge control terminal COUT. The switch parts 6 and 7 are, for example, transistors such as a metal oxide semiconductor field effect transistor (MOSFET).

The protecting IC 5 includes a detecting part 15 and a control circuit 18. The control circuit 18 outputs a control signal from at least one control terminal in response to a detection result obtained by the detecting part 15. The detecting part 15 is formed by an analogue circuit. The control circuit 18 is formed by a logic circuit.

The detecting part 15 includes an overcharge detecting circuit of monitoring an electric power supply voltage VB between the electric power supply terminal VDD and the ground terminal VSS for protecting the secondary battery 2 from overcharge, for example. In a case where the overcharge detecting circuit detects an event that the electric power supply voltage VB becomes a predetermined overcharge detection threshold Vdet1 or greater, the control circuit 18 causes a charge control signal of turning off the switch part 7 to be output from the charge control terminal COUT (an overcharge protection operation). When the switch part 7 is turned off, a current of charging the secondary battery 2 is shut off and therefore the secondary battery 2 can be prevented from being overcharged.

The control circuit 18 may output a charge control signal for turning off the switch part 7 after a lapse of a predetermined overcharge detection delay time tVdet1 after a detection of an event that the electric power supply voltage VB becomes a predetermined overcharge detection threshold Vdet1 or greater. It is possible to prevent a turnoff of the switch part 7 caused by an erroneous detection of overcharge by waiting a lapse of an overcharge detection delay time tVdet1.

The detecting part 15 includes an overdischarge detecting circuit of monitoring an electric power supply voltage VB between the electric power supply terminal VDD and the ground terminal VSS for protecting the secondary battery 2 from the overdischarge, for example. In a case where the overdischarge detecting circuit detects an event that the electric power supply voltage VB becomes a predetermined overcharge detection threshold Vdet2 or smaller, the control circuit 18 causes a discharge control signal of turning off the switch part 6 to be output from the discharge control terminal DOUT (an overdischarge protection operation). When the switch part 6 is turned off, a current of discharging the secondary battery 2 is shut off and therefore the secondary battery 2 can be prevented from being overdischarged.

The control circuit 18 may output the discharge control signal for turning off the switch part 6 after a lapse of a predetermined overdischarge detection delay time tVdet2 after a detection of an event that the electric power supply voltage VB becomes a predetermined overdischarge detection threshold Vdet2 or smaller. It is possible to prevent a turnoff of the switch part 6 caused by an erroneous detection of overdischarge by waiting a lapse of the overdischarge detection delay time tVdet2.

The detecting part 15 includes a discharge overcurrent detecting circuit of monitoring a current detection voltage VI between the current detection terminal VM and the ground terminal VSS for protecting the secondary battery 2 from the discharge overcurrent, for example. In a case where the discharge overcurrent detecting circuit detects an event that the current detection voltage VI becomes a predetermined discharge overcurrent detection threshold Vdet3 or greater, the control circuit 18 outputs a discharge control signal of turning off the switch part 6 from a discharge control terminal DOUT (a discharge overcurrent protection operation). When the switch part 6 is turned off, a current of discharging the secondary battery 2 is shut off and therefore an overcurrent of discharging the secondary battery 2 can be prevented from flowing.

The control circuit 18 may output a discharge control signal of turning off the switch part 6 after a lapse of a predetermined discharge overcurrent detection delay time tVdet3 after the discharge overcurrent detecting circuit detects that the current detection voltage VI becomes a predetermined discharge overcurrent detection threshold Vdet3 or greater. It is possible to prevent a turnoff of the switch part 6 caused by an erroneous detection of a discharge overcurrent by waiting a lapse of the discharge overcurrent detection delay time tVdet3.

The detecting part 15 includes a charge overcurrent detecting circuit of monitoring a current detection voltage VI between the current detection terminal VM and the ground terminal VSS for protecting the secondary battery 2 from the charge overcurrent, for example. In a case where the charge overcurrent detecting circuit detects an event that the current detection voltage VI becomes a predetermined charge overcurrent detection threshold Vdet4 or smaller, the control circuit 18 outputs a charge control signal of turning off the switch part 7 from the charge control terminal COUT (a charge overcurrent protection operation). When the switch part 7 is turned off, a current of charging the secondary battery 2 is shut off and therefore an overcurrent of charging the secondary battery 2 can be prevented from flowing.

The control circuit 18 may output a charge control signal of turning off the switch part 7 after a lapse of a predetermined charge overcurrent detection delay time tVdet4 after the charge overcurrent detecting circuit detects that the current detection voltage VI becomes a predetermined charge overcurrent detection threshold Vdet4 or smaller. It is possible to prevent a turnoff of the switch part 7 caused by an erroneous detection of a charge overcurrent by waiting a lapse of the charge overcurrent detection delay time tVdet4.

The sensor input terminal ST is an example of an input terminal. A check terminal 13 and a sensor 12 are connected to the sensor input terminal ST. The check terminal 13 is provided on the above board 4. An external apparatus 23 (see FIG. 4 or the like) such as inspection equipment and an electronic apparatus is connected to the check terminal 13. By providing the check terminal 13, the external apparatus 23 can easily access the sensor input terminal ST while the protecting IC 5 is installed in the boards 4. A specific example of the check terminal 13 is an electrode, a land, a connector.

Referring to FIG. 2, the sensor 12 detects a fault in the battery pack 1 or in the electronic apparatus having the battery pack 1 and outputs a fault signal indicating a detection of the fault. The fault signal output from the sensor 12 is input into the sensor input terminal ST. The sensor 12 is connected to the positive terminal 2a of the secondary battery 2 so as to be supplied with the power from the secondary battery 2. The sensor 12 detects breaking of the battery pack 1 or a cover that covers the battery pack 1 and outputs a fault signal indicative of the breaking.

Hereinafter, in a case where a case covers the battery pack, an expression of "a cover covering the battery pack is unsealed" may also mean that the case is unsealed.

Figure 3:
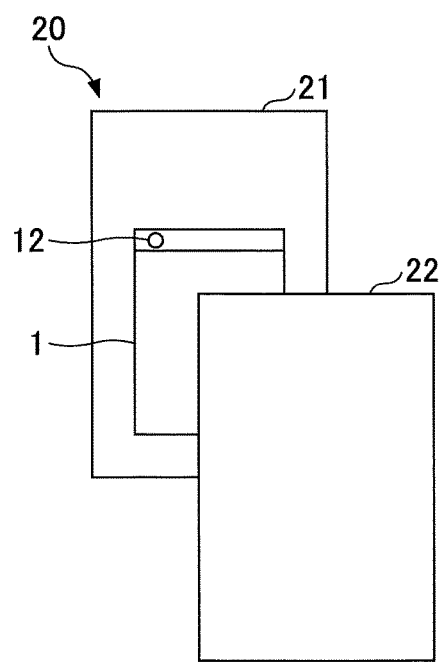
FIG. 3 illustrates an example of a state where a package covering a battery pack is unsealed.

FIG. 3 illustrates an example that a cover covering the battery pack is unsealed. The battery pack 1 is used as an electric power supply for the electronic apparatus 20. The electronic apparatus 20 is, for example, a portable electronic apparatus 20 such as a smartphone.

The electronic apparatus 20 includes a casing 21 accommodating the battery pack 1 and a cover 22 covering the battery pack 1 accommodated in the casing 21. In an ordinary state of using the electronic apparatus 20, the cover 22 is assembled with the casing so as to cover the battery pack 1 accommodated in the casing 21.

When the cover 22 is unsealed, the sensor 12 outputs a fault signal indicating a detection of the unsealing. The sensor 12 may be mounted on the battery pack 1 or the casing 21. In a mode where the sensor 12 is mounted on the battery pack, the sensor 12 may be installed on an outer surface of the battery pack 1 or inside the battery pack 1 (for example, the above board 4).

The sensor 12 is a light-receiving sensor detecting the unsealing of the cover 22, for example. The light-receiving sensor detects the unseal of the cover 22 by sensing an outside light. By sensing the input outside light from the opened cover 22, the unseal of the cover 22 can be detected. In a mode where the light-receiving sensor is provided inside the battery pack, the light-receiving sensor may sense outside light input through a window formed in an outer surface of the battery pack 1.

FIG. 3 illustrates an example of a mode where the sensor 12 senses unsealing of the cover 22 being one part of the electronic apparatus 20. However, the sensor 12 may be a device of outputting a fault signal that is generated upon sensing of the unsealing of the battery pack 1 itself and indicates the detection of the unseal. In this case, the sensor 12 is built in the battery pack 1.

Figure 4:
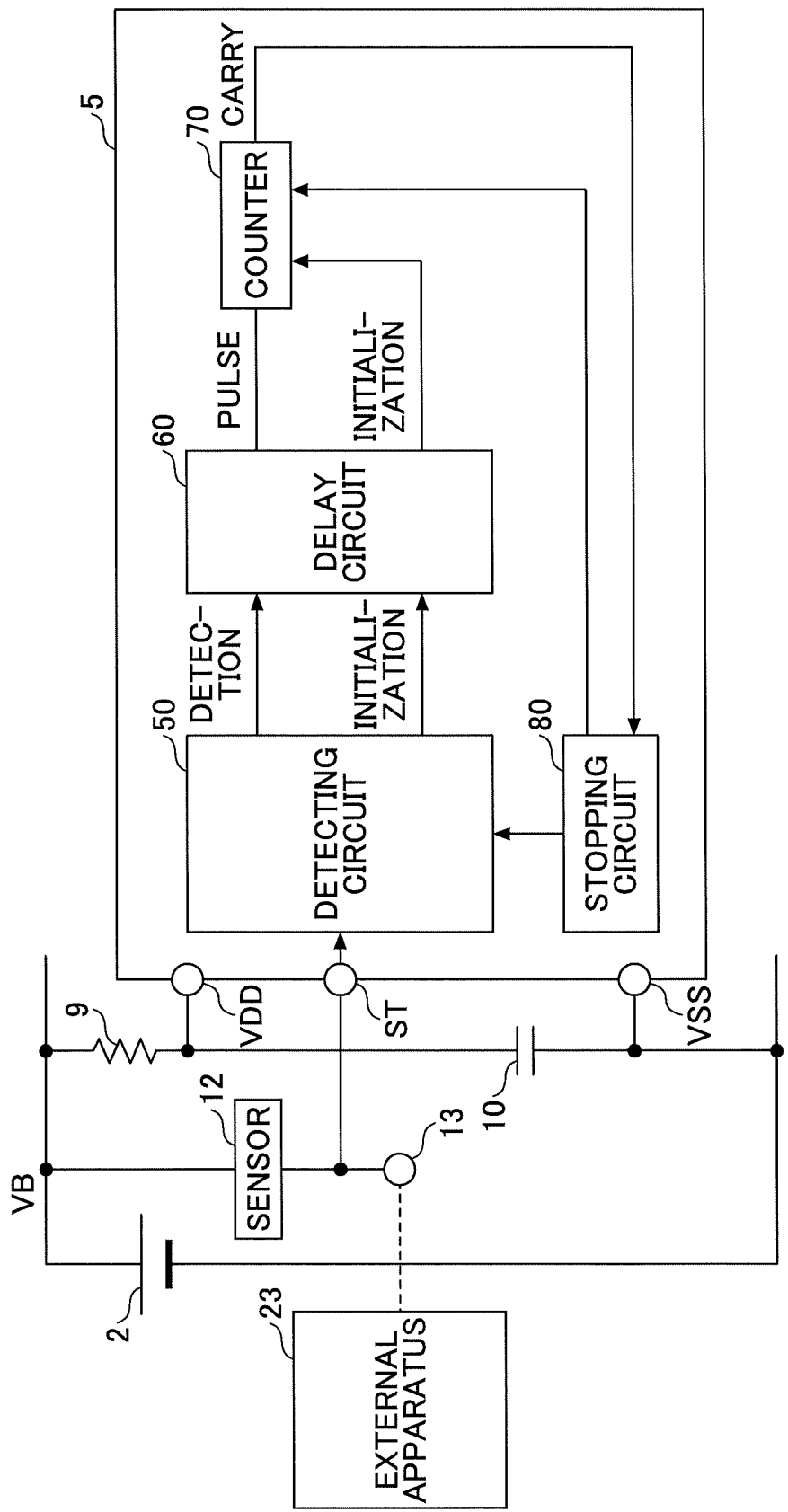
FIG. 4 illustrates an example of a first structure of a part of a secondary battery protecting integrated circuit.

FIG. 4 illustrates an example of a first structure of a part of a secondary battery protecting integrated circuit. A protecting IC 5 as an example of the secondary battery protecting integrated circuit illustrated in FIG. 4 includes a detecting circuit 50, a delay circuit 60, a counter 70, and a stopping circuit 80.

The detecting circuit 50 detects a fault signal input through the sensor input terminal ST from the sensor 12 and outputs the fault detection signal (hereinafter, referred to as a "fault detection signal Sd") indicative of the detection of the fault signal.

The delay circuit 60 outputs a pulse CK delayed from the fault detection signal Sd. The delay circuit 60 outputs one-shot pulse CK after a lapse of a predetermined delay time from a time when the fault detection signal Sd is input into the delay circuit 60. The delay circuit 60 does not output one-shot pulse CK in a case where an input of the fault detection signal Sd disappears until the lapse of a predetermined delay time from a timing when the fault detection signal Sd is input into the delay circuit 60. The delay circuit 60 generates a delay time by a timer, for example.

The counter 70 is an example of a counter that counts the number of the pulse CK generated by the delay circuit 60 and stops an operation by a count of $2^{(N-1)}$ (N is an integer greater than 1). The counter 70 outputs a value (for example, a binary digit, or a binary coded decimal (BCD)), in which the pulse CK is counted. The counter 70 is formed by including multiple flip flops provided with, for example, a cascade connection. These flip flops may be a toggle flip flop (a T flip flop) or a flip flop of another type including a counting circuit. The type of the counter 70 may be synchronous or asynchronous. The counter 70 is formed by a logic circuit.

Accordingly, within the embodiment, the number of detecting fault signals by the detecting circuit 50 (the number of fault detections) can be registered as a count value in the counter 70. Because the counter 70 can be formed by a general purpose logic circuit, it is possible to prevent the circuit size of storing the number of fault detections from increasing in comparison with a mode of storing the number of fault detections in a nonvolatile memory. Within the embodiment, it is possible to prevent a circuit size storing the history of the fault detection from increasing. Because the circuit size can be prevented from increasing, for example, a cost-cutting and downsizing of the protecting IC become possible.

The protecting IC 5 is constantly supplied with electric power from the secondary battery 2. Therefore, even though a nonvolatile memory is not used, it is possible to leave the history of the fault detection on the counter 70.

Further, if a fault signal in the sensor 12 or a fault detection signal Sd in the detecting circuit 50 is erroneously generated by a noise, the pulse CK is not output from the delay circuit 60. Therefore, it is possible to prevent the number of fault detections from being erroneously recorded in the counter 70.

The protecting IC 5 may have a stopping circuit 80 for stopping count of the pulse CK by the counter 70 based on a carry output from the counter 70. The number of cascade connections of the flip flops inside the counters is n. When the number of fault detections stored in the counter 70 as a count value reaches 2 (n−1) times (8 times where n=4), the carry indicative of an overflow of the flip flop on the (n−1) stage of the counter 70 is output. However, if the count number of the pulse CK becomes $2^n$ (16 times where n=4) or greater, the count value stored in the counter 70 returns to zero. Then, because the stopping circuit 80 is provided, the count of the pulse CK can be stopped if the number of fault detections stored as the count value in the counter 70 reaches $2^{(n-1)}$ times. As a result, it is possible to prevent the number of fault detections, which is caused by the counter 70 of counting more than necessary, from being zero.

Figure 5:
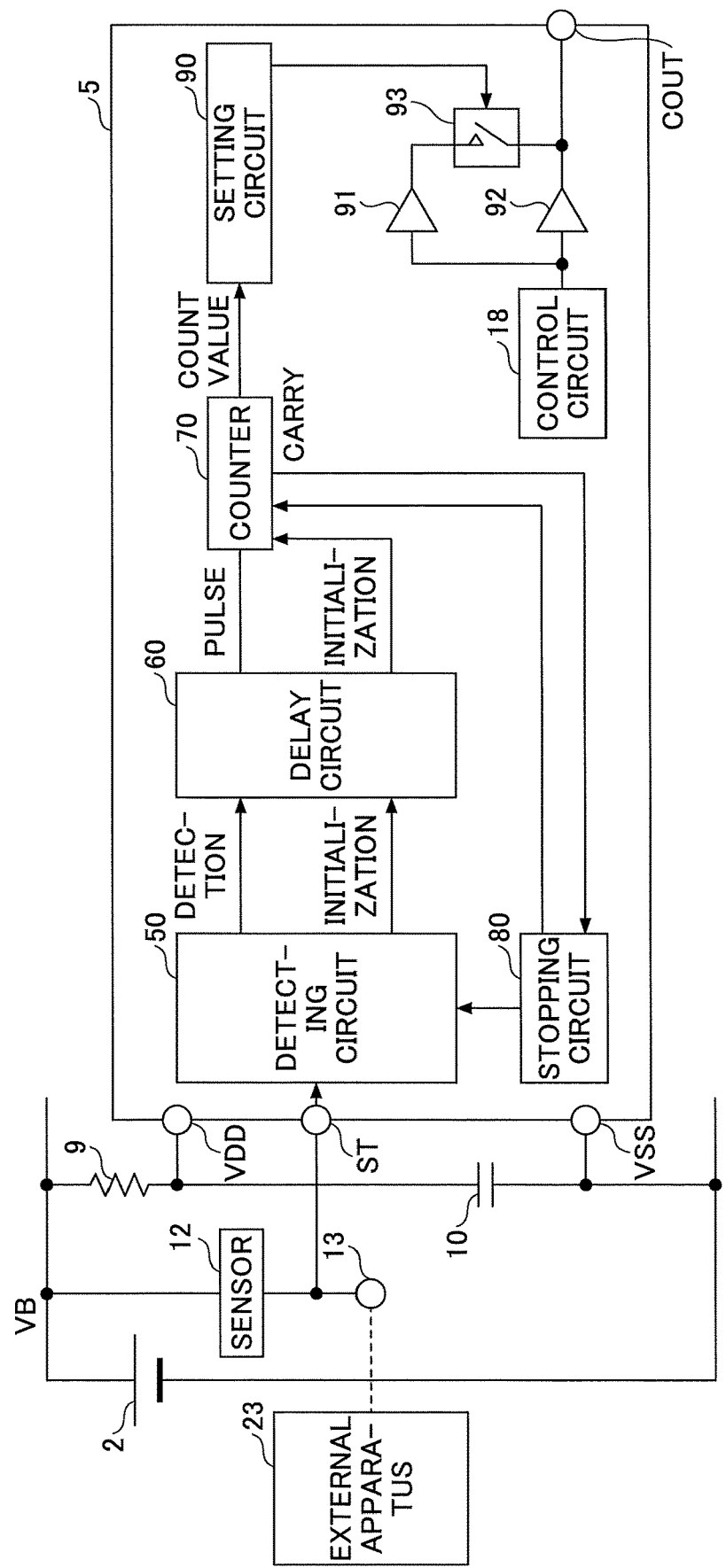
FIG. 5 illustrates an example of a second structure of the part of the secondary battery protecting integrated circuit.

FIG. 5 illustrates an example of a second structure of a part of the secondary battery protecting integrated circuit. The protecting IC 5 as an example of the secondary battery protecting integrated circuit illustrated in FIG. 5 includes a setting circuit 90, buffers 91 and 92, and a switch 93. The setting circuit 90 sets an electronic characteristic of the protecting IC 5 n response to the count value held by the counter 70. The control circuit 90 is formed by a logic circuit. The setting circuit 90 includes a decode circuit outputting a switch signal of whether the switch is turned on in response to the count value held by the counter 70, for example.

In the mode illustrated in FIG. 5, the setting circuit 90 changes an output impedance of the charge control terminal COUT of the protecting IC 5 in response to a count value of the counter 70. The output impedance is an example of the electrical characteristics of the protecting IC. The setting circuit 90 turns off the switch 93 when the count value is 0 ad turns on the switch 93 when the count value is 1 or greater. Because the buffers 91 and 92 having a resistance are connected in parallel after the switch 93 is turned on, the output impedance of the charge control terminal COUT decreases.

Therefore, the external apparatus 23 such as inspection equipment can read the number of fault detections stored in the counter 70 in response to a difference of the output impedance of the charge control terminal COUT. For example, the external apparatus 23 can recognize that the number of fault detections is 0 in a case where a monitor value of the output impedance of the charge control terminal COUT is a first resistance value and that the number of fault detections is 1 or more in a case where the monitor value of the output impedance of the charge control terminal COUT is a second resistance value lower than the first resistance value. However, even though the output impedance changes, the voltage level output from the charge control terminal COUT does not change. Therefore, the change of the output impedance does not influence an operation of the switch part 7 connected to the outside of the charge control terminal COUT.

The setting circuit 90 may change the output impedance of the discharge control terminal DOUT of the protecting IC 5 in response to the count value of the counter 70. In this case also, the external apparatus 23 can acquire the number of fault detections stored in the counter 70 depending on a difference of the monitor value of the output impedance of the discharge control terminal DOUT.

Figure 6:
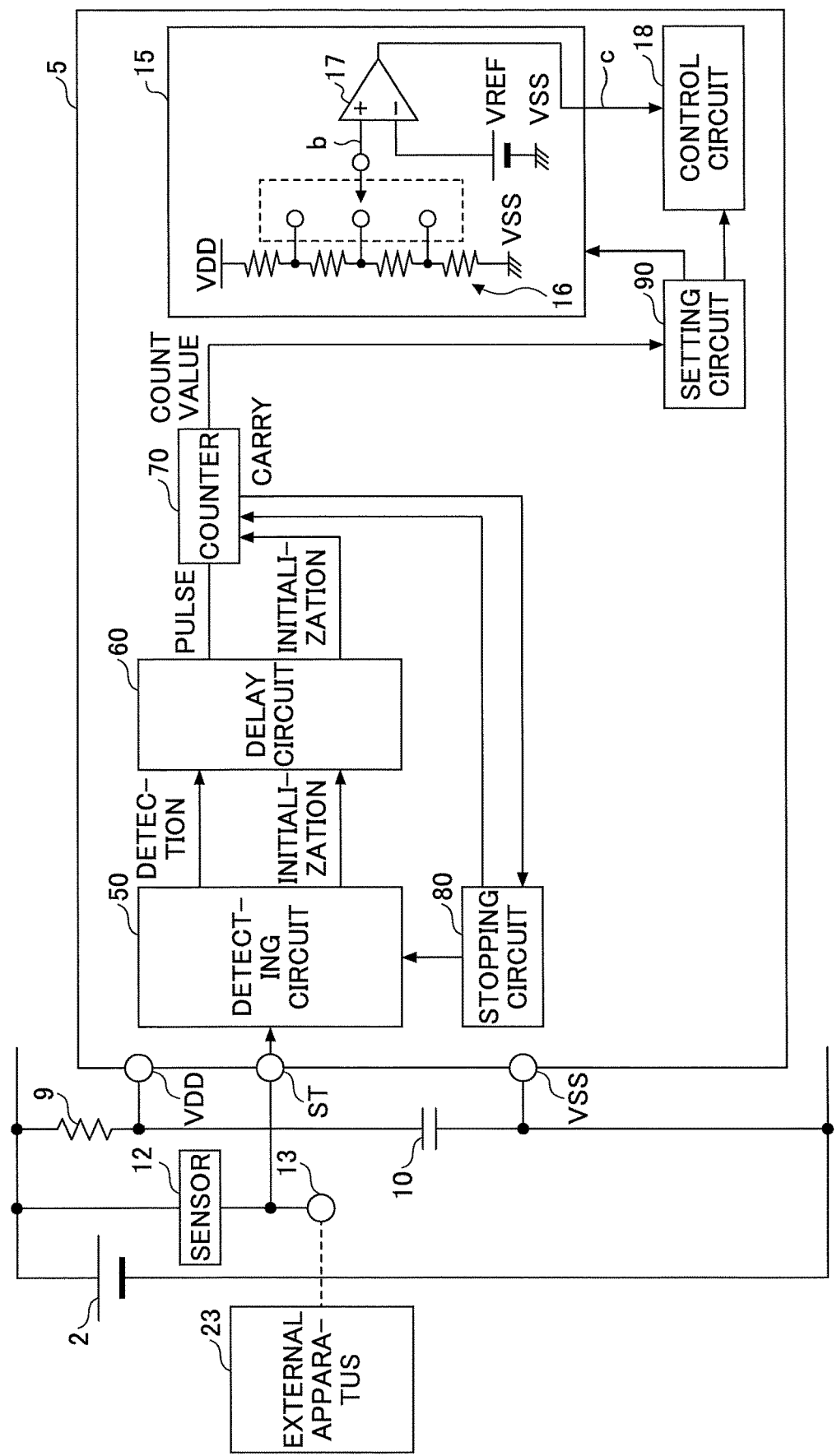
FIG. 6 illustrates an example of a third structure of the part of the secondary battery protecting integrated circuit.

FIG. 6 illustrates an example of a third structure of a part of the secondary battery protecting integrated circuit. The setting circuit 90 illustrated in FIG. 6 changes at least one of the electrical characteristic of the detecting part 15 and the electrical characteristic of the control circuit 18 in response to the count value of the counter 70. The electrical characteristic of the detecting part 15 and the electrical characteristic of the control circuit 18 are examples of the electrical characteristic of the protecting IC 5.

The detecting part 15 monitors an electric power supply voltage VB between the electric power supply terminal VDD and the electric power supply voltage VB. The detecting part 15 is, for example, the above overcharge detecting circuit or the above overdischarge detecting circuit. The detecting part 15 monitors the electric power supply voltage VB by dividing the electric power supply voltage VB using a detection resistor 16. The detecting part 15 includes a comparator 17 of comparing the voltage (a divided voltage b) obtained by dividing the electric power supply voltage VB with the reference voltage VREF and outputs a comparison result signal obtained by the comparator 17 to the control circuit 18. Said differently, the reference voltage VREF corresponds to the above overcharge detection threshold Vdet1.

The detecting part 1 may substantialize the above discharge overcurrent detecting circuit or the above detecting circuit as long as the comparator 17 monitors the current detection voltage VI between the current detection terminal VM and the ground terminal VSS.

The control circuit 18 protects the secondary battery 2 from at least one of the overcharge, the overdischarge, the discharge overcurrent, and the charge overcurrent by turning off the switch part 6 or the switch part 7 based on the comparison result signal c of the comparator 17.

The setting circuit 90 sets a detection characteristic being one of the electrical characteristics of the detecting part 15 by trimming using the count value held by the counter 70. The setting circuit 90 has a decode circuit decoding the count value held by the counter and outputs the decoded count value. The setting circuit 90 selects a resistance value of the detection resistor 16 in response to an output signal of the decode circuit and trims a voltage dividing ratio of the electric power supply voltage VB between the electric power supply terminal VDD and the ground terminal VSS. With this, the detection characteristic of detecting the overcharge or the like of the detecting part 15 is subjected to a setup change.

Figure 7:
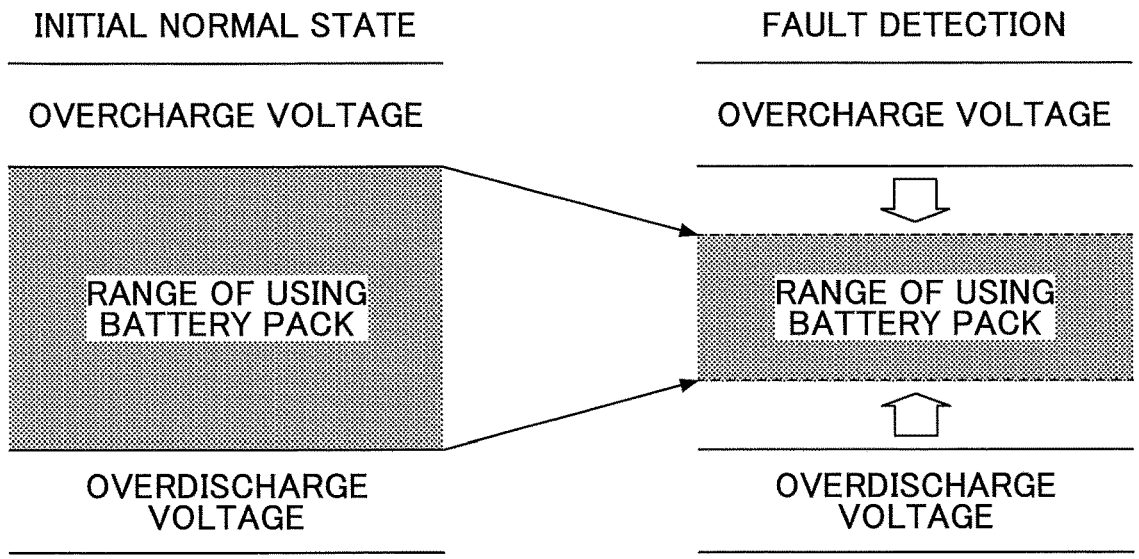
FIG. 7 illustrates an example of a setup change of a detection characteristic being one of electric characteristics.

FIG. 7 illustrates an example of a setup change of the detection characteristic being one of the electric characteristics. The setting circuit 90 decreases the setup value of the overcharge detection threshold Vdet1 when the count value exceeds a predetermined value of, for example, one or greater, and increases the setup value of the overdischarge detection threshold Vdet2. With this, in a case where the number of fault detections exceeds the predetermined value, it is possible to narrow the range of using battery pack. As a result, a continuous use by the user can be limited. The setting circuit 90 may change at least one of the discharge overcurrent detection threshold Vdet3 and the charge overcurrent detection threshold Vdet4 in response to the count value held by the counter 70.

Referring FIG. 6, the setting circuit 90 may set the delay time during which the control circuit 18 delays a signal in response to the count value held by the counter 70. Specific examples of the delay time during which the control circuit 18 delays the signal are the overcharge detection delay time tVdet1, the overdischarge detection delay time tVdet2, the discharge overcurrent detection delay time tVdet3, and the charge overcurrent detection delay time tVdet4, as described above.

Figure 8:
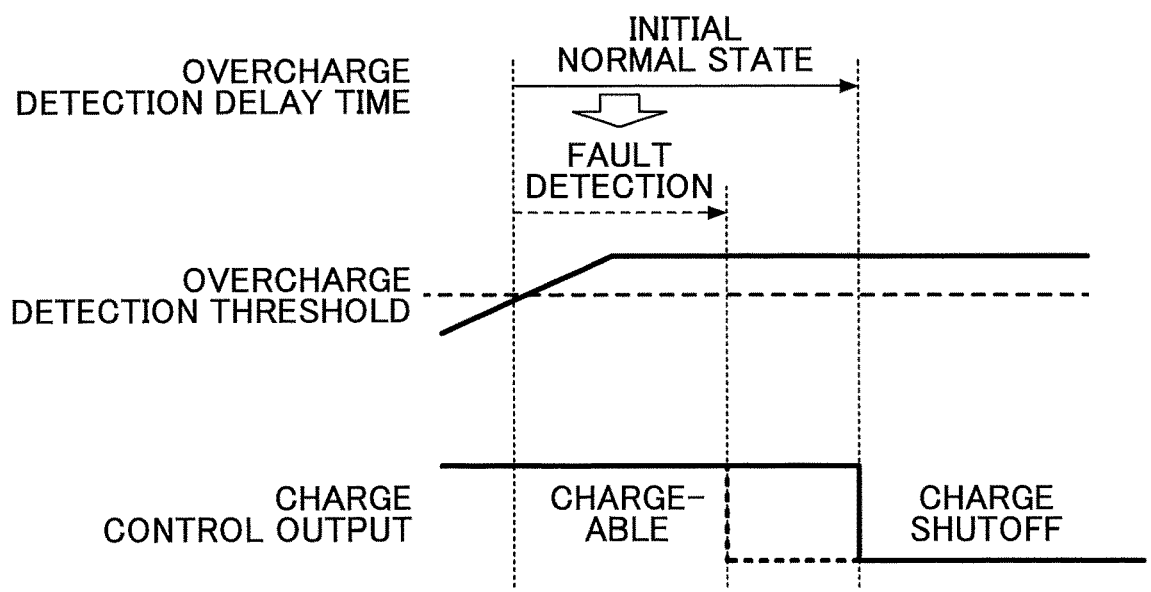
FIG. 8 illustrates an example of a setup change of a delay time being one of the electric characteristics.

FIG. 8 illustrates an example of a setup change of the delay time being one of the electric characteristics. The setting circuit 90 decreases the setup value of the overcharge detection delay time tVdet1 in a case where the count value exceeds the predetermined value. With this, a range of using the battery pack can be narrowed. With this, in a case where the number of fault detections exceeds the predetermined value, it is possible to narrow the range of using the battery pack. As a result, a continuous use by the user can be limited. The setting circuit 90 may change at least one of the overdischarge detection delay time tVdet2, the discharge overcurrent detection delay time tVdet3, and the charge overcurrent detection delay time tVdet4 in response to the count value held by the counter 70.

Figure 9:
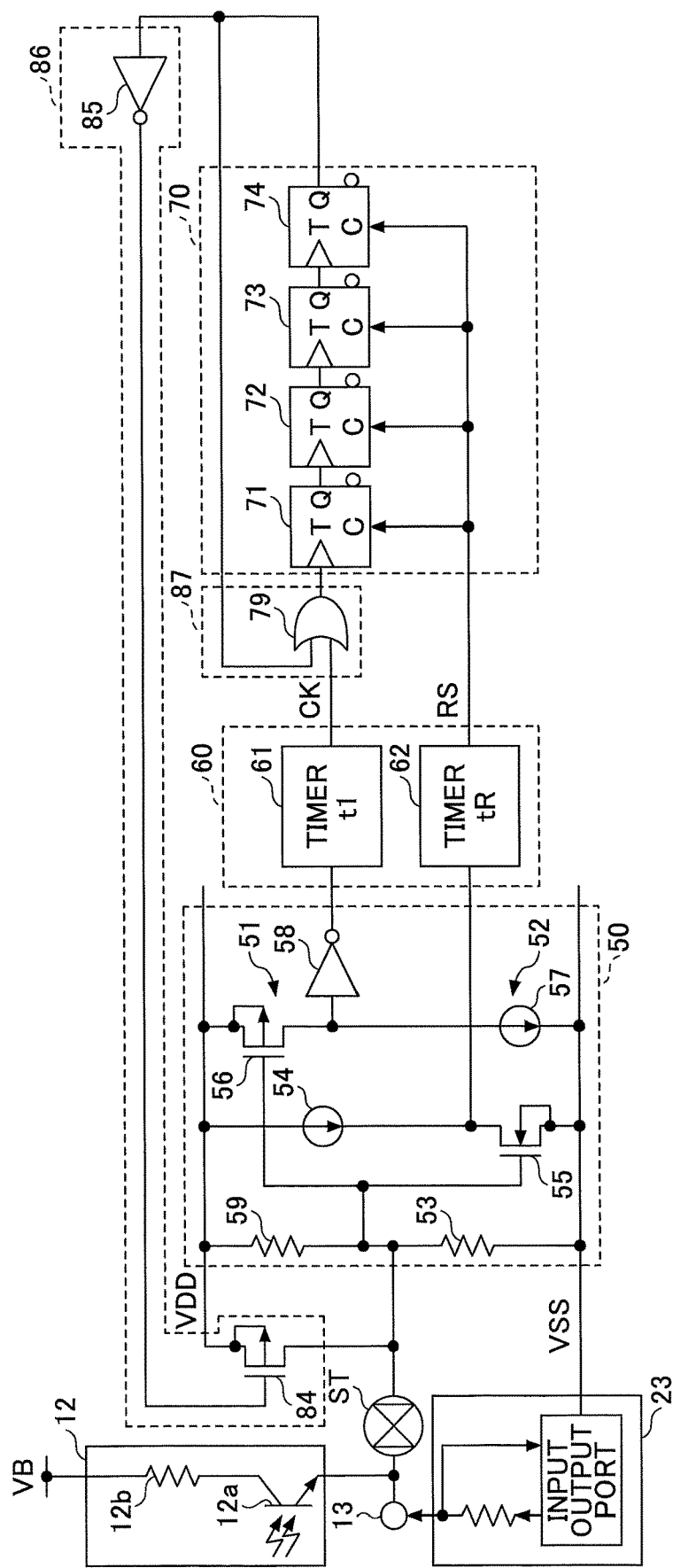
FIG. 9 illustrates an example of the part of the secondary battery protecting integrated circuit.
Figure 10:
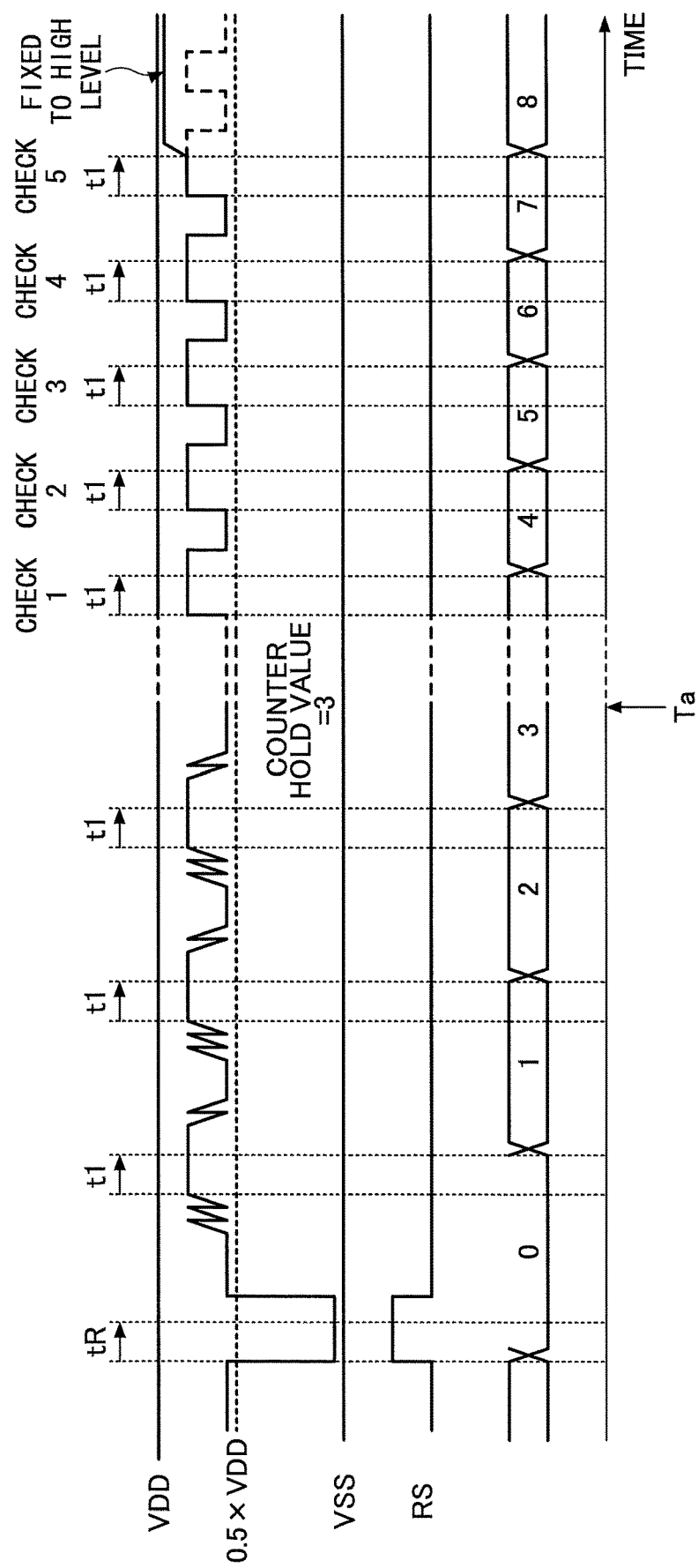
FIG. 10 illustrates a timing chart as an example of an operation of the secondary battery protecting integrated circuit.

FIG. 9 illustrates an example of the part of the secondary battery protecting integrated circuit. FIG. 10 illustrates a timing chart as an example of an operation of the secondary battery protecting integrated circuit illustrated in FIG. 9. FIG. 9 illustrates a case where the sensor is a light-receiving sensor.

The sensor 12 illustrated in FIG. 9 includes a serial circuit, in which a phototransistor 12a and a resistor element 12b are connected in series. The phototransistor 12a is turned off in a state where the outside light is not sensed, and the phototransistor 12a is turned on in a state where the outside light is sensed.

The detecting circuit 50 includes resistor elements 53 and 59, a fault detection part 51 detecting the fault signal from the sensor 12, and an initialization detecting part detecting an initialization signal from the external apparatus 23.

The resistor elements 53 and 59 are an example of a voltage dividing circuit generating an intermediate voltage (for example, a voltage equal to 0.5 times the electric power supply voltage VB) between the electric power supply terminal VDD and the ground terminal VSS.

The fault detection part 51 outputs the fault detection signal Sd indicative of the detection of the fault signal. The fault detection part 51 includes a PMOS 56, a constant current source 57, and an inverter 58. Here, PMOS is an abbreviation of P-channel type MOSFET.

When the sensor 12 detects the unsealing, the phototransistor 12a is switched from an off state to an on state, and therefore the logic level of the sensor input terminal ST changes from an intermediate voltage level to a high level. As a result, the PMOS 56 of the fault detection part 51 is switched from the on state to the off state, therefore the signal level output from the inverter 58 is switched from a low level to a high level. Said differently, the fault detection signal Sd of the high level is output from the inverter 58.

On the other hand, the initialization detecting part 52 outputs an initialization detection signal indicating that the initialization signal is detected. The initialization detecting part 52 includes an NMOS 55 and a constant current source 54. Here, NMOS is an abbreviation of N-channel type MOSFET. The NMOS 55 is turned on by an input of an intermediate voltage between the electric power supply terminal VDD and a ground terminal VSS.

When an initialization signal of a low level is input into the check terminal 13 from the input output port of the external apparatus 23, the logic level of the sensor input terminal ST is changed from an intermediate voltage level to the low level. As a result, the NMOS 55 of the fault detection part 55 is switched from the on state to the off state, therefore the signal level output from the NMOS 55 is switched from a low level to a high level. Said differently, the initialization detection signal of a high level is output from the NMOS 55.

The delay circuit 60 has a timer 61 outputting a pulse CK delayed from the fault detection signal Sd. The timer 61 outputs a pulse CK of one shot in a case where the fault detection signal Sd is detected for a delay time of t1 or longer.

The delay circuit 60 has a timer 62 outputting a pulse CK delayed from the fault detection signal Sd. The timer 62 outputs the reset signal RS of a high level (see FIG. 10) in a case where the initialization detection signal is detected for a delay time tR or longer.

The counter 70 includes multiple (four in FIG. 9) T flip flops 71, 72, 73, and 74 in the cascade connection. Each of the T flip flops 71, 72, 73, and 74 includes an input terminal T, an output terminal T, an output terminal Q, and a clear terminal C. Each of the T flip flops 71, 72, 73, and 74 operates such that the level of the output terminal Q inverts as the logic given to the input terminal T changes by one cycle. The counter 70 outputs a carry (a carryover signal of a high level) from the flip flop 74 on the final stage when the number of fault detections reaches 8 ($2^{(4-1)}$) times. FIG. 9 illustrates a count prohibiting circuit 87. The count prohibiting circuit 87 is one of the above stopping circuit (see FIG. 4 or the like) for stopping the count of the pulse CK by the counter 70 based on the carry output from the counter 70. The count prohibiting circuit 87 prohibits the counter 70 from counting the pulse CK based on the carry output from the counter. With this, even if the pulse is input by the noise or the like after outputting the carry, it is possible to prevent the counter 70 from counting the pulse CK.

The count prohibiting circuit 87 fixes the electric potential of a pathway (specifically, an input unit of the flip flop at the first stage) through which the pulse CK is input into the counter 70 to prohibit the counter 70 from counting the pulse CK. In the mode of FIG. 9, the count prohibiting circuit 87 includes an OR circuit 79. The OR circuit 79 calculates the logical sum of the pulse CK and the output signal from the flip flop 74 at the final stage of the counter 70. With this, after outputting the carry, the input level of the counter 70 is fixed to the high level.

FIG. 9 also illustrates a detection prohibiting circuit 86. The detection prohibiting circuit 86 prohibits the detecting circuit 50 from detecting the fault signal based on the carry output from the counter 70. With this, even if the fault signal is newly input from the sensor 12 after outputting the carry, it is possible to prevent the fault detection signal Sd from being newly output from the detecting circuit 50.

The detection prohibiting circuit 86 fixes the electric potential of the pathway (specifically, the sensor input terminal ST), through which the fault signal is input into the detecting circuit 50, in order to prohibit the detecting circuit 50 form detecting the fault signal, for example. In the mode illustrated in FIG. 9, the detection prohibiting circuit 86 includes an inverter 85 and a PMOS 84. The inverter 85 inverts the output signal of the counter 70. The detection prohibiting circuit 86 turns on the PMOS 84 when the carry is detected (when a carryover signal of a high level is input into the inverter 85). With this, the sensor input terminal ST is pulled up to be the high level. With this, after outputting the carry, the input level of the detecting circuit 50 is fixed to the high level.

Described next is a data reading method of reading the number of the fault detections recorded in the counter 70.

The counter 70 outputs the carry at a time of carry. The external apparatus 23 counts the number of check pulses e input into the check terminal 13 until the carry is output from the counter 70. The external apparatus 23 can detect that the carry is output from the counter 70 by detecting by the input output port an event where the sensor input terminal ST is fixed to the high level.

The number of the check pulses e input into the counter 70 until the carry of the counter 70 is detected is X. Here, the count value held in the counter 70 is Y. The number of cascade connections of the flip flops inside the counter 70 is n. In this case, a relation of "$Y=2^{(n-1)}-X$" is established. The external apparatus 23 can calculate a count value Y held in the counter 70 in a state before the check pulse e is input in conformity with a relational expression "$Y=2^{(n-1)}-X$". Said differently, the external apparatus 23 can read the count value Y from the outside.

For example, FIG. 10 illustrates a case where the count value Y held in the counter 70 is 3 in a state Ta where the check pulse e has not been input. The external apparatus 23 can detect that the count value indicating the number of the fault detections is 3 in a case where the sensor input terminal ST is fixed to the high level at a stage where five check pulses e are input.

Within the above embodiments, the battery pack, the secondary battery protecting integrated circuit, the secondary battery protecting apparatus, and the data reading method have been described. However, the present invention is not limited to the embodiments.

The sensor 12 detecting the unsealing of the cover is not limited to the light-receiving sensor 22. The sensor may be a mechanical switch, in which contact points are physically switched over by the unsealing of the case. The mechanical switch may be a limit switch, a micro switch, or the like.

The number of the sensors may be one or multiple. Multiple sensors 12 may be connected to one sensor input terminal ST in common. Alternatively, the multiple sensors 12 may be respectively connected to multiple different sensor input terminals ST.

For example, the positions of a charge control transistor and a discharge control transistor as the switch parts 6 and 7 may be replaced each other in FIG. 2. Further, the switch circuit may be built in the protecting IC.

According to the secondary battery protecting integrated circuit, the secondary battery protecting apparatus, or the battery monitoring module of the disclosure, an increase in the circuit size for storing a history of fault detections can be restricted. According to the data reading method of the disclosure, a history of the fault detections can be easily read out.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the battery pack has been described in detail, it should be understood that the various changes, substitutions, and alterations could be made hereto without departing from the spirit and scope of the invention.

What is claimed is:

1. A battery pack comprising:
   a secondary battery;
   a secondary battery protecting integrated circuit configured to protect the secondary battery;
   at least one sensor configured to output a fault signal indicating sensing of a fault in the battery pack or an electronic apparatus including the battery pack;
   a detecting circuit configured to output a fault detection signal indicating a detection of the fault signal;
   a delay circuit configured to output a pulse delaying from the fault detection signal;
   a counter configured to count a number of generating the pulse, the counter having at least N bits (N is an integer greater than 1), the counter stopping an operation until a count of $2^{(N-1)}$; and
   a detection prohibiting circuit whose input is electrically connected to an output of the counter and whose output is electrically connected to an input of the delay circuit, the detection prohibiting circuit being configured to receive an output signal from the counter so as prohibit a fault detection in the detecting circuit.

2. The battery pack according to claim 1, the battery pack further comprising:
   a stopping circuit configured to stop the count of the pulse by the counter based on a carry output from the counter.

3. The battery pack according to claim 2,
   wherein the stopping circuit fixes an electric potential of at least one of a pathway of inputting the fault signal into the detecting circuit and a pathway of inputting the pulse into the counter.

4. The battery pack according to claim 1, the battery pack further comprising:
   a setting circuit configured to set electrical characteristics of the secondary battery protecting integrated circuit in response to the count value held by the counter.

5. The battery pack according to claim 4,
   wherein the secondary battery protecting integrated circuit includes:
   a detecting part configured to detect at least one of overcharge, overdischarge, discharge overcurrent, and charge overcurrent of the secondary battery, and
   a control circuit configured to output a control signal from at least one control terminal in response to a detection result obtained by the detecting part,
   wherein the electrical characteristics are at least one of an electrical characteristic of the detecting part, an electrical characteristic of the control circuit, and an output impedance of the control terminal.

6. The battery pack according to claim 1,
wherein the sensor outputs the fault signal in a case where the sensor senses unsealing of the battery pack or a cover of covering the battery pack.

7. The battery pack according to claim 6,
wherein the sensor is a light-receiving sensor sensing the unsealing.

8. The battery pack according to claim 6,
wherein the sensor is a mechanical switch sensing the unsealing.

9. The battery pack according to claim 1,
wherein the counter is constantly supplied with electric power from the secondary battery so as to enable to count the number of generating the pulse and holding the counted number using the N flip-flops in the counter as a history of the fault in the battery pack.

10. A secondary battery protecting integrated circuit for protecting a secondary battery, the secondary battery protecting integrated circuit comprising:
a detecting circuit configured to detect a fault signal indicating sensing of a fault in the battery pack or an electronic apparatus including the battery pack and to output a fault detection signal indicating a detection of the fault signal;
a delay circuit configured to output a pulse delaying from the fault detection signal;
a counter configured to count a number of generating the pulse, the counter having at least N bits (N is an integer greater than 1), the counter stopping an operation until a count of $2^{(N-1)}$; and
a detection prohibiting circuit whose input is electrically connected to an output of the counter and whose output is electrically connected to an input of the delay circuit, the detection prohibiting circuit being configured to receive an output signal from the counter so as prohibit a fault detection in the detecting circuit.

11. The secondary battery protecting integrated circuit according to claim 10,
wherein the counter is constantly supplied with electric power from the secondary battery so as to enable to count the number of generating the pulse and holding the counted number using the N flip-flops in the counter as a history of the fault in the battery pack.

12. A data reading method of reading a data from a secondary battery protecting integrated circuit of protecting a battery pack, the secondary battery protecting integrated circuit including an input terminal from which a fault signal indicating sensing of a fault in the battery pack or an electronic apparatus including the battery pack is input, a detecting circuit configured to output a fault detection signal indicating a detection of the fault signal, and a delay circuit configured to output a pulse delaying from the fault detection signal, and a counter configured to count a number of generating the pulse, the counter having at least N bits (N is an integer greater than 1), the data reading method comprising:
stopping an operation of the counter until a count of $2^{(N-1)}$;
inputting a check pulse into the input terminal; and
counting the check pulse until a carry is output from the counter, and
receiving, by a detection prohibiting circuit whose input is electrically connected to an output of the counter and whose output is electrically connected to an input of the delay circuit, the carry from the counter so as to prohibit a fault detection in the detecting circuit.

13. The data reading method according to claim 12, the data reading method further comprising:
constantly supplying electric power from the secondary battery so as to enable to count the number of generating the pulse and holding the counted number using the N flip-flops in the counter as a history of the fault in the battery pack.

* * * * *